March 20, 1973 L. H. SOBEL 3,721,433
DEFORMABLE SHACK ABSORBING GUARD
Filed Nov. 21, 1969 3 Sheets-Sheet 1
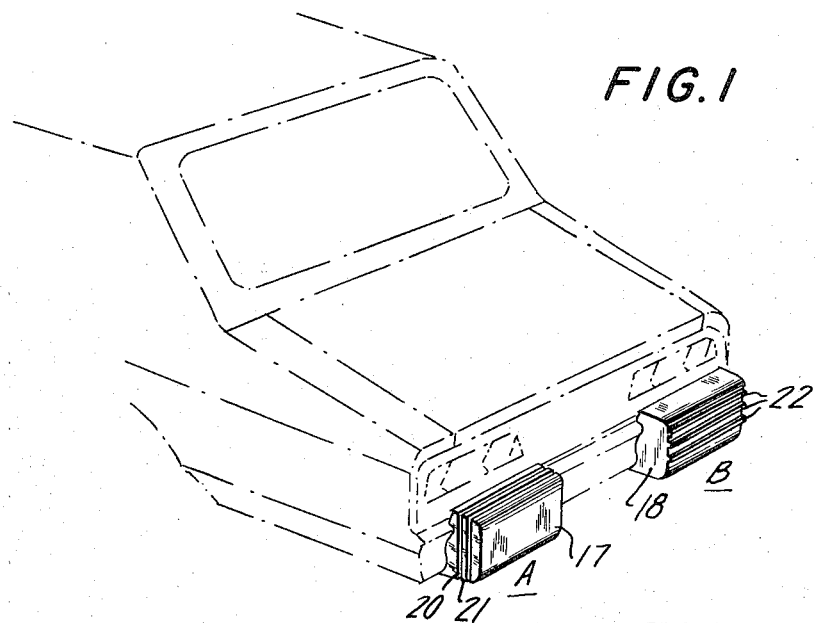
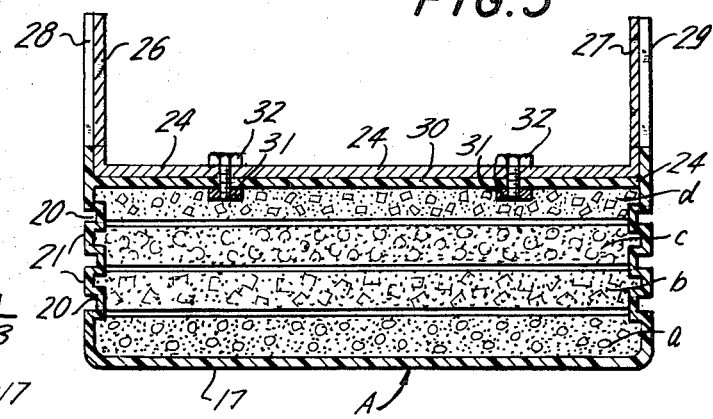
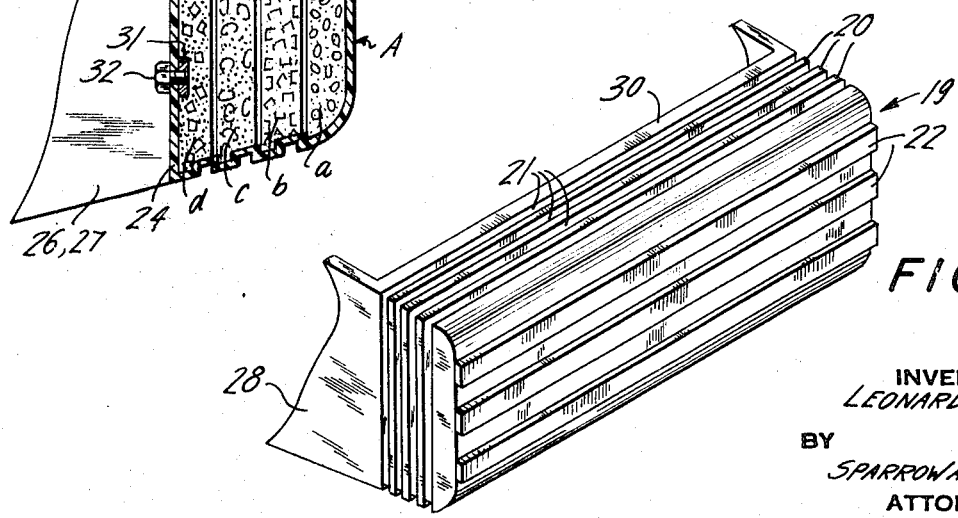
INVENTOR
LEONARD H. SOBEL
BY
SPARROW AND SPARROW
ATTORNEYS March 20, 1973  L. H. SOBEL  3,721,433
DEFORMABLE SHACK ABSORBING GUARD
Filed Nov. 21, 1969  3 Sheets-Sheet 2
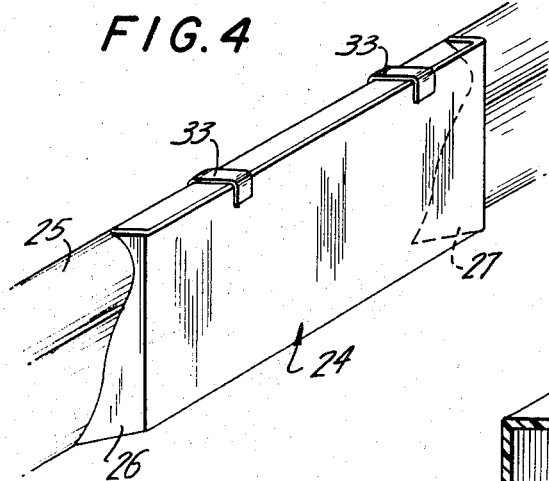
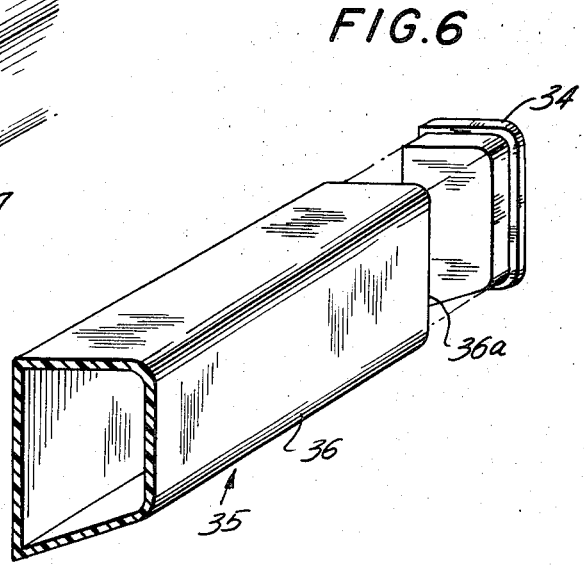
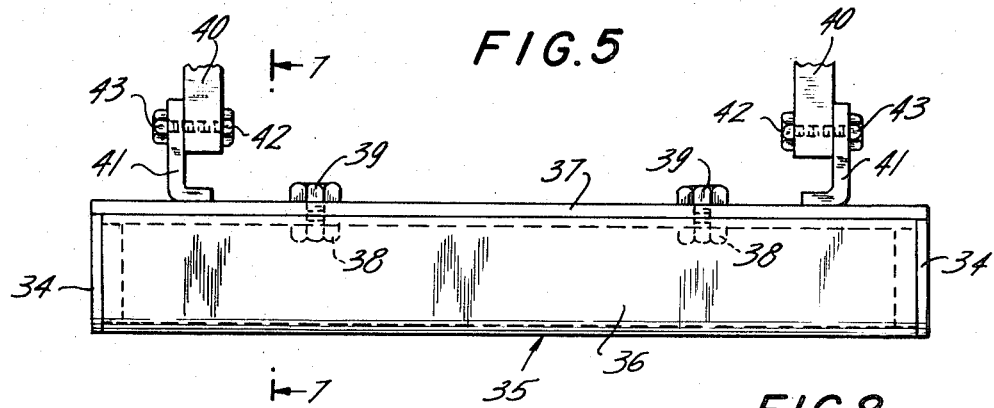
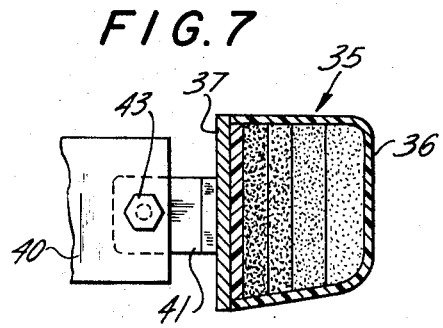
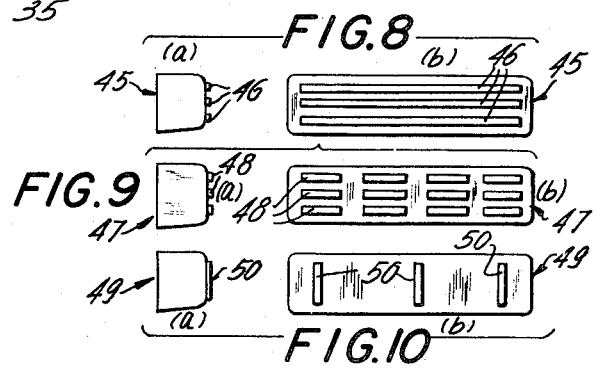
INVENTOR
LEONARD H. SOBEL
BY
SPARROW AND SPARROW
ATTORNEYS March 20, 1973     L. H. SOBEL     3,721,433

DEFORMABLE SHACK ABSORBING GUARD

Filed Nov. 21, 1969     3 Sheets-Sheet 3

INVENTOR
LEONARD H. SOBEL
BY
SPARROW AND SPARROW
ATTORNEYS

United States Patent Office 3,721,433
Patented Mar. 20, 1973

3,721,433
DEFORMABLE SHOCK-ABSORBING GUARD
Leonard H. Sobel, Rockaway Park, N.Y., assignor to Collision Devices, Inc.
Continuation-in-part of application Ser. No. 792,737, Jan. 21, 1969. This application Nov. 21, 1969, Ser. No. 878,657
Int. Cl. F60r 9/00; F16d 63/00; F16f 13/00
U.S. Cl. 267—140    7 Claims

ABSTRACT OF THE DISCLOSURE

Energy-absorbing crash or collision devices for vehicles or the like to reduce shock of collision by utilizing energy-absorbing components which are flexible and compressible and/or rigid, frangible and crushable, which components may be used singly or in combination, to effect gradual deceleration upon collision. A resilient or rigid but yieldable housing encases the energy-absorbing components.

BACKGROUND OF THE INVENTION

The invention relates to vehicle crash or collision devices which provide protection against personal injury and property damage during collision and is a continuation-in-part of my co-pending application Ser. No. 792,737 filed Jan. 21, 1969, now Pat. No. 3,610,609, issued Oct. 5, 1971. Existing impact-resistant devices for vehicles usually employ rubber strips mounted on front and rear bumpers. When the rubber is compressed, as during the impact of collision, its reaction is practically instantaneous expansion causing the colliding vehicles to rebound or recoil from each other. For example when a standing vehicle is struck in the rear by another moving vehicle, the rebounding or springing back on collision or impact frequently results in whiplash effect on the passenger which increases the chances of neck, back and spinal injuries. Rubber mounted on rigid metal has poor energy-absorbing qualities and provides little or no prohibition during collision at high speeds. The same disadvantage is applicable when using spring devices which do not absorb gradually and furthermore expand rapidly after impact causing the vehicle to recoil or bounce back. Another disadvantage of previous types of crash or collision devices is that abrupt deceleration results from collision.

These disadvantages are overcome by the devices according to the invention which employ energy-absorbing materials or components encased in a resilient or rigid yet yieldable housing, which effects gradual deceleration of a colliding body.

SUMMARY

The invention consists in such novel features, construction, arrangements, combinations of parts and improvements as may be shown and described in connection with the devices herein disclosed by way of examples only and as illustrative of preferred embodiments. The invention comprises energy-absorbing crash or collision devices for vehicles and structures to reduce shock of collision by utilizing energy-absorbing components which are flexible and compressible and/or frangible, rigid and crushable. The components may be used singly or in combination, to effect gradual deceleration upon collision, such components being contained in a resilient housing. These components are comprised of materials which fall in one or more of several respective categories, such as, rigid, frangible, crushable or flexible compressible or of a type comprising a combination of such rigid, frangible, and flexible materials. Where rigid crushable energy-absorbing material is used per se, kinetic energy of the moving bodies is converted to work in crushing said material. Different densities of material can be employed to effect gradual deceleration and thereby minimize the impact of collision. Such materials may be of either uniform or varied densities. The energy-absorbing material and the housing within which it is encased constitute an energy-absorbing package. The housing is resilient so that it will flexibly give upon impact with a colliding body without sustaining permanent deformation.

Where the package consists of both flexible compressible material and substantially rigid frangible crushable material, maximum practical effect is achieved so that upon a low speed collision, such as that encountered when bumping another vehicle or other obstruction, for example, during parking, the compressible material will come into play and return to its normal condition undamaged when pressure is released; and in the case of a more severe collision, for example, that occurring during higher speeds of the vehicle when the flexible compressible material will be fully compressed, kinetic energy is dissipated as the rigid frangible crushable component is crushed. The flexible and rigid components may be arranged alternately or in groupings to effect the most efficient deceleration. Furthermore, different densities of components may be employed to further aid in accomplishing safe deceleration.

It is an object of the present invention to provide an energy-absorbing crash or collision device having a housing which encases energy or shock-absorbing material which compresses and/or crushes under the force of impact, offering various magnitudes of increased, constant or diminishing resistance as it is compressed and/or crushed.

It is a further object of the present invention to provide a resilient or rigid but yieldable plastic housing which contains the energy-absorbing material.

A still further object of the present invention is to provide packaged energy-absorbing collision devices in various forms of adaptations.

Another object of the present invention is to provide packaged energy-absorbing collision devices, such as bumpers, with protrusions for preventing overriding or slippage between colliding bodies.

Yet another object of the present invention is to provide lands and grooves in the housing, facilitating or aiding the package to be compressed upon impact with a colliding body and the compressible material therein to return to initial condition when the load is removed.

Other objects of the present invention are to provide energy-absorbing crash or collision devices of the foregoing nature and embodying the foregoing qualifications, which may be utilized as replacement bumpers, as an attachment or accessory for an existing bumper with provisions to conform to the shape of the bumper; which may be formed in strips of any length and thereafter cut therefrom into lesser suitable lengths for various applications such as for use in connection with marine craft, docks, bridge abutments, etc. The crash or collision device may constitute part of a craft, vehicle or trailer.

Various further and more specific purposes, objects, features and advantages will clearly appear from the detailed description given below, taken in connection with the accompanying drawings which form part of this specification and illustrate, merely by way of examples, embodiments of the devices of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawings in which:

FIG. 1 is a perspective view of a motor vehicle (in phantom outline) having attached thereto for illustrative purposes two different types of energy-absorbing crash or collision devices according to the invention;

FIG. 2 is a detail sectional view of one of the collision devices seen in FIG. 1;

FIG. 3 is a sectional view taken through 3—3 of FIG. 2;

FIG. 4 shows in isometric projection a plate or mounting to which the collision device of FIG. 2 is attached;

FIG. 5 is a top view of a further embodiment of the invention depicting an energy-absorbing collision device in the form of a vehicle bumper;

FIG. 6 shows in isometric projection a transverse section of a resilient housing which encases the energy-absorbing components with one of the end caps, shown for illustrative purposes separated from the body of the housing;

FIG. 7 is a sectional view taken through 7—7 of FIG. 6;

FIG. 8 illustrates a housing having longitudinal protrusions, employable in the invention, (a) being an end view and (b) being a front view thereof;

FIG. 9 illustrates a housing having a series of short protrusions, employable in the invention, (a) being an end view and (b) being a front view thereof;

FIG. 10 illustrates a housing having vertical protrusions, employable in the invention, (a) being an end view and (b) being a front view thereof;

FIG. 11 is an isometric projection of a collision device having a housing combining the structural design of A and B seen in FIG. 1;

DESCRIPTION OF THE PREFERRED EMBODIMENTS

Figure 15:
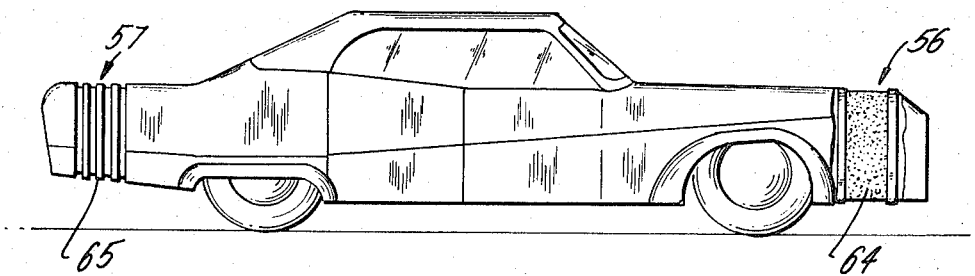
FIG. 15 is a perspective view of a motor vehicle having atached thereto an energy-absorbing crash or collision device at the rear of the vehicle and a similar device at the front thereof with the flexible housing omitted.

Referring to the drawings, FIG. 1 depicts two types of crash or collision devices, A and B respectively. The housing of type A is provided with accordion-like or perimetric lands 20 and grooves 21 (see also FIG. 11). The housing of type B is provided with longitudinal protrusions 22. These housings, generally indicated by the numerals 17, 18 respectively, encase the energy-absorbing components or materials; for example, those seen in FIGS. 2, 13, 14, and 15. Housings 17 and 18 of the crash devices A and B preferably consist of flexible or resilient plastic and the energy-absorbing components encased in the housings may consist of plastic materials which are flexible and compressible and/or rigid frangible and crushable. The components may be used singly or in combination to effect gradual deceleration when impacted during collision. The construction of the components may be of the open or closed cell variety of foams or foam-like materials.

FIGS. 2 and 4 show a preferred mounting 23 for the crash device. It comprises a plate 24 which is attached to the vehicle bumper 25 and which conforms in contour with the shape of the bumper 25 (FIG. 4). Plate 24 has two end flanges 26, 27 which are at right angles to plate 24. Housing A or B is provided with extensions 28, 29 which abut against the flanges 26, 27 of plate 24. The back 30 of the housing is secured to plate 24 by any suitable means, such as bolts 31 and nuts 32, the bolts being embedded within the energy-absorbing component d. Mounting plate 24 is fixed to bumper 25 by means of clamps 33 or the like.

FIG. 2 shows a possible arrangement of energy-absorbing components or blocks within housing A or B. For example, component "a" may comprise a flexible and compressible closed cell plastic foam-like material which is selected to accommodate low speed collisions, for example, parking bumps. Component "b" may comprise a six pound per cubic foot coarse, open cell rigid and crushable foam-like material which would accommodate collisions occurring at high speeds. Component "c" may comprise a flexible and compressible open cell foam-like material of a higher density than component "a." Component "d" may comprise an eight pound per cubic foot fine rigid and crushable closed cell foam-like material whose structure is calculated to collapse in collisions occurring at high speed ranges. It is understood that the number of components may be increased and the type and arrangement of components may be varied commensurate with the kinetic energy levels governed by weight and speed of the colliding vehicles involved.

FIG. 5 depicts a full length energy-absorbing crash or collision bumper 35 which may replace the conventional bumper. It comprises a unit consisting of a resilient housing made of suitable plastic material 36 which encases energy-absorbing components such as, for example, the types herein described. Housing 36 is preferably provided with end caps secured to ends 36a of housing 36, so that the energy-absorbing components may be completely enclosed and sealed in the housing. Bumper 35 is mounted on a rigid back plate 37 by any suitable means such as bolts and nuts 38, 39. Plate 37 is secured to the chassis 40 of the vehicle, for example, by means of brackets 41 and bolts and nuts 42, 43. FIG. 7 is a transverse section of FIG. 5, and as an example depicts energy-absorbing components similar to those disclosed in FIG. 13, but which, of course, may comprise components depicted in FIG. 7;

FIGS. 8, 9, and 10 show variations in resilient housings encasing the energy-absorbing components. FIGS. 8(a) and (b) depicts a housing 45 having the longitudinal disposed protrusions or ribs 46 which are employed to prevent nose-diving of colliding vehicles. FIG. 9(a) and (b) depicts a housing 47 having a series of short ribs or protrusions 48. FIG. 10 depicts a housing 49 having vertical ribs or protrusions 50.

Figure 12:
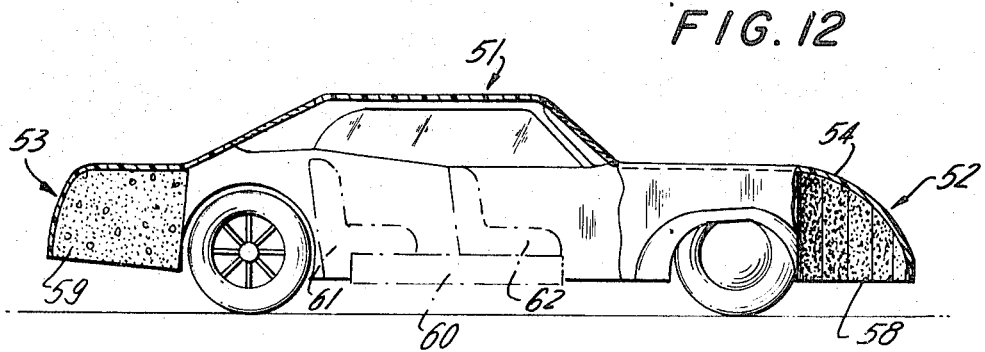
FIG. 12 illustrates a motor vehicle in which the front and rear parts of the body and shell or housing of the body are comprised of different forms of energy-absorbing flexible and rigid frangible crash components in various density arrangements.

FIG. 11 shows in isometric projection an energy-absorbing collisions device having a housing 19 combining the rib or protrusion features 20, 22 of the housing types 17 and 18 depicted in devices A and B of FIG. 1;

FIG. 12 depicts schematically, in section, a motor vehicle 51 whose major body portions comprise energy-absorbing collision devices. Both front and rear portions, 52, 53, and side portions (not seen), may be constituted of any of the types of energy-absorbing collision devices herein described. The housing 54 which forms the outer shell of the body may be flexible and compressible or rigid and crushable. The front portion 52 of the vehicle shows an arrangement using a plurality of components of energy-absorbing materials 58 such as described with reference to FIG. 2 or depicted in FIG. 13. The rear portion 53 of the vehicle shows an arrangement consisting of a single type of energy-absorbing material 59 which may be of either open or closed cell construction. However, these arrangements are interchangeable. Units comprising the housing or portions thereof and encased energy-absorbing components may be manufactured in the form of replaceable self-contained cartridges. The power plant 60 may be located below the seats 61, 62.

Figure 13:
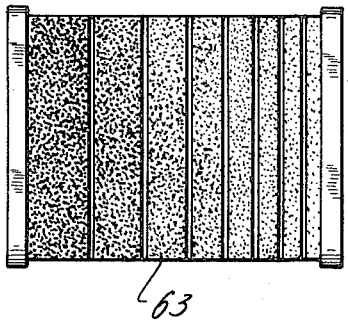
FIG. 13 is a side view of energy-absorbing device depicting a plurality of components of different densities.

FIG. 13 shows an energy-absorbing device 63 comprised of a plurality of components which may be flexible and compressible and/or rigid and crushable. These components are of different densities and therefore have different compressible ranges.

Figure 14:
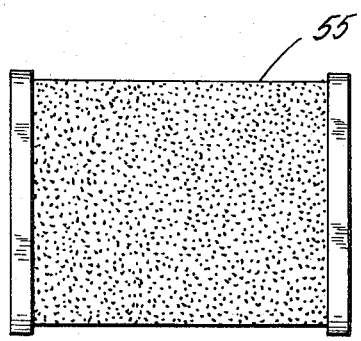
FIG. 14 is a side view of energy-absorbing device of uniform density.

FIG. 14 shows an energy-absorbing component comprised of a compressible member 55 which is of uniform density.

FIG. 15 shows another possible arrangement of energy-absorbing collision devices utilizable in combination with motor vehicles. The front collision device 56 utilizes a type of energy-absorbing component 64 depicted in FIG. 14. The rear collision device 57 includes an accordion-pleated housing or casing 65 enclosing the energy-absorbing components.

While the invention has been described and illustrated with respect to certain preferred examples, it will be understood by those skilled in the art after understanding the principle of the invention, that various changes and modifications may be made without departing from the spirit and scope of the invention.

What is claimed is:

1. Energy-absorbing, collision device comprising a pair of spaced rigid plates, defining outside walls of said device, one of said plates being movable in relation to the other; rigid frangible cellular plastic material, said rigid frangible material being substantially destroyed during an impact to absorb energy; and flexible compressible cellular plastic material sequentially arranged directly adjacent said frangible material to engage each other during impact, said flexible compressible material being compressed during said impact and ultimately returning to the original configuration after forces of said impact have been released; said flexible and said rigid cellular materials being located between said plates.

2. Energy-absorbing collision device defined by claim 1 wherein said rigid frangible cellular plastic material comprising a replaceable part of a vehicle, said rigid frangible material being substantially destroyed during an impact to absorb energy.

3. Energy-absorbing collision device according to claim 2, and flexible compressible plastic material disposed adjacent said rigid frangible cellular material, said flexible material being compressed during said impact and having a protracted return after forces of said impact have been released.

4. Energy-absorbing collision device according to claim 2, said replaceable part comprising a body part of said vehicle.

5. Energy-absorbing collision device according to claim 4, and flexible compressible plastic material disposed adjacent said rigid frangible cellular material and forming an element of said body part of said vehicle, said flexible material being compressed during said impact and having a protracted return after forces of said impact have been released.

6. Energy-absorbing collision device comprising a vehicle bumper having a rigid back plate, an expandable and retractable interiorly and exteriorly pleated housing secured to said back plate, energy-absorbing components within said housing, said components comprising rigid frangible cellular and flexible compressible cellular materials, said interior pleats positioning said energy absorbing components.

7. Energy-absorbing collision device according to claim 6, said housing having a plurality of protrusions on its front face.

References Cited

UNITED STATES PATENTS

| | | | |
|---|---|---|---|
| 1,519,967 | 12/1924 | Hughes | 293—71 P |
| 1,601,641 | 9/1926 | Ostria | 293—71 P |
| 278,007 | 5/1883 | Garsed | 24—125 R |
| 1,655,777 | 1/1928 | Weiland | 293—88 |
| 2,724,463 | 11/1955 | Becker | 188—268 |
| 2,857,510 | 10/1958 | Haggerty et al. | 325—112 |
| 2,890,904 | 6/1959 | Materi | 293—71 P |
| 3,010,540 | 11/1961 | Dahlen | 188—1 C |
| 3,265,163 | 8/1966 | Gilbert et al. | 188—1 C |
| 3,307,868 | 3/1967 | Blank | 293—70 |
| 2,251,347 | 8/1941 | Williams et al. | 213—221 |
| 2,829,915 | 4/1958 | Claveau | 293—71 P |
| 2,997,325 | 8/1961 | Peterson | 293—1 |
| 3,378,296 | 4/1968 | Crocker | 293—65 X |
| 3,493,257 | 2/1970 | Fitzgerald et al. | 293—63 X |

GERALD M. FORLENZA, Primary Examiner

H. BELTRAN, Assistant Examiner

U.S. Cl. X.R.

188—1 C; 213—1 A, 221; 267—152; 293—1, 63, 65, 71 R